United States Patent [19]
Durbin

[11] 3,831,445
[45] Aug. 27, 1974

[54] FLUID VELOCITY METER
[76] Inventor: Enoch J. Durbin, 246 Western Way, Princeton, N.J. 08540
[22] Filed: May 8, 1972
[21] Appl. No.: 250,964

[52] U.S. Cl............................................. 73/194 F
[51] Int. Cl.............................................. G01f 1/00
[58] Field of Search................................. 73/194 F

[56] References Cited
UNITED STATES PATENTS
3,470,741 10/1969 Durbin ............................. 73/194 F
3,648,517 3/1972 Dorman............................ 73/194 F

*Primary Examiner*—Charles A. Ruehl

[57] ABSTRACT

This disclosure is related to apparatus described in an earlier patent for mass flow meter apparatus awarded to the present inventor wherein the mass flow of flowing fluids was measured by directly measuring the drift of ionized portions of said fluid. The invention disclosed herein relates in particular to an improvement on said previous Patent in which apparatus is provided to eliminate calibration changes of the previous invention due to changes in mobility of ions of the fluid thereby converting the previous invention into a fluid velocity meter from a mass flow meter.

13 Claims, 5 Drawing Figures

FLUID VELOCITY METER

BACKGROUND OF THE INVENTION

This invention is related to the invention disclosed in Pat. application Ser. No. 733,204, filed Apr. 30, 1968, now U.S. Pat. No. 3,470,741, and to Pat. application Ser. No. 181,704, dated Sept. 20, 1971, titled "Fluid Volume Flow Meter," now abandoned.

In U.S. Pat. No. 3,470,741 a fluid mass flow meter apparatus is described which comprised an ionizing means having a first voltage polarity applied thereto which was located proximate to the point of fluid flow and an ion collecting means having a second voltage polarity applied thereto located proximate to said point of fluid flow but opposite to the ionizing means, wherein the said ionizing means in the presence of fluid causes a plurality of ions of the fluid to be formed thereabout.

The plurality of ions formed about the ionizing means migrates toward the ion collecting means in response to the voltage difference between the ionizing means and the collecting means and this plurality of ions impinges on the ion collecting means. Means are provided which are responsive to the location of the region of impingement of the migrating plurality of ions on the collecting means in order to measure the displacement there of effected by the mass flow variation of the fluid between the ionizing means and the ion collecting means. This displacement of the location of the region of impingement of the migrating ions in the presence of a fluid flow as measured from the location of the region of impingement of the migrating plurality of ions under the condition of no flow is proportional to the fluid mass flow through the apparatus for any given fluid.

In the apparatus above, the amount of the incremental displacement of the migrating plurality of ions in an incremental portion of its drift path in relation to the quantity of fluid flow through that incremental portion of its drift path is dependent on the transit time required for an ion in the migrating plurality of ions to pass through that incremental portion of its drift path. This incremental displacement is actually inversely proportional to this transit time. Patent Application Ser. No. 181,704 titled "Fluid Volume Flow Meter," now abandoned, provides apparatus for measuring the transit time of ions to control changes in calibration due to changes in said transit time.

When such variations in this transit time are caused by variations in the composition of the fluid, they are said to be due to changes in ion mobility.

In many instances it may be desirable to make the calibration of the apparatus independent of the ion mobility, without the need for actually measuring the transit time of the ions.

For example, if it is desired to use the apparatus to measure fluid velocity rather than fluid mass flow, it is necessary to make the calibration independent of the fluid density and consequently of ion mobility.

For example, if it is desired to use the apparatus to measure fluid velocity independent of fluid composition, it is necessary to make the calibration independent of fluid composition and consequently of ion mobility.

For example, if it is desired to use the apparatus to measure fluid velocity in an environment which is contaminated by smoke, foreign particles, or changing humidity, it is necessary to make the calibration independent of these environmental factors and consequently of ion mobility.

Since in each of these examples the variations in the calibration is ultimately due to the change in the ion mobility, it is an object of this invention to provide a relatively simple and inexpensive ion drift fluid velocity flow meter apparatus which can make the ratio of the displacement of the location of the region of impingement of the migrating plurality of ions to the velocity of the fluid being measured by the apparatus independent of the mobility of ions in the fluid being measured.

In accordance with this invention apparatus is provided which permits the elimination of changes in the calibration of an ion drift fluid velocity meter due to changes in ion mobility. Since the calibration of the fluid velcoity meter is inversely proportional to the ion velocity which is transverse to the fluid velocity being measured, and since the ion velocity is equal to the product of the electric field intensity and the ion mobility, the velocity can be made independent of the ion mobility by providing apparatus which causes the electric field intensity in the region of the migrating ions to be inversely proportional to the ion mobility. This result can be most simply achieved by providing measuring apparatus in which the principles of construction satisfy three conditions simultaneously.

First the Electric Field Intensity in the region of the migrating ions should be mostly determined by the space charges of those ions rather than by the surface charges on the electrodes of the apparatus.

Second the current which is collected by the ion collecting means should be kept constant or must be known.

Third the apparatus should be constructed to permit the space charge density to vary with changes in ion mobility.

When all three conditions are satisfied the calibration constant can be made independent of the mobility of the ions.

The invention will be understood in greater detail by reference to the following descriptions of several embodiments thereof in conjunction with the accompanying drawings.

Figure 1:
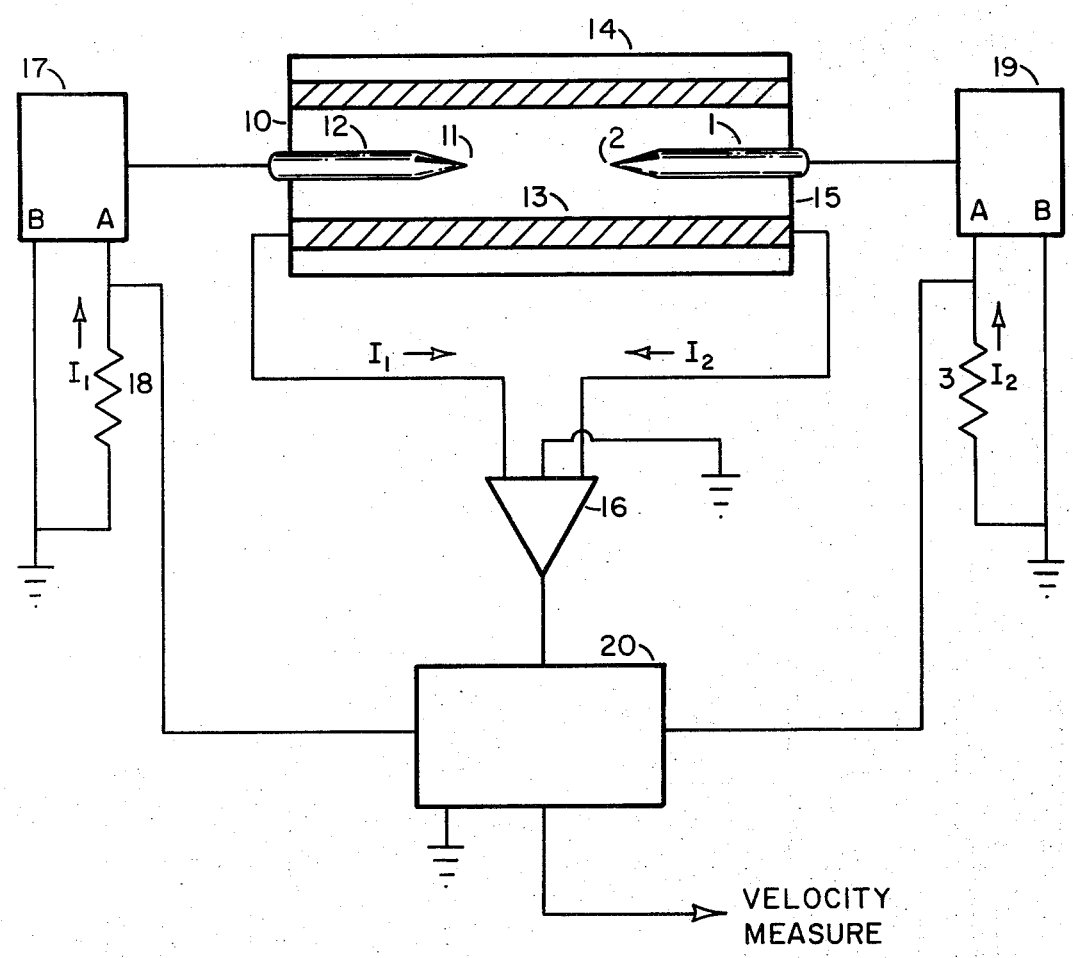
FIG. 1 is a combined pictorial and electrical circuit diagram showing one coaxial form of the invention employing two separate power supplies.

Referring to FIG. 1, the ionizing means are two electrodes 1, 12 in the form of cylindrical rods which have regions of reduced radius of curvature 2, 11 within the coaxial ion collecting electrode 13 and positioned so as to be concentric with the axis of symetry thereof. The electrodes 1, 12 are mounted within the ion collecting electrode 13 by mounting structure 15, 10 which are positioned at either end of the velocity meter housing structure 14. The ion collecting electrode 13 is supported in the hollow coaxial cylindrical housing structure 14 and is insulated electrically therefrom.

The ion collecting electrode 13 is an electrical resistance member suitably wound or deposited. Each end of the ion collecting means 13 is connected to the input of a differential amplifier 16. The output of the differential amplifier 16 thus indicates the difference in currents $I_1$ and $I_2$ which flow through either end of the ion collecting means 13. The output of the differential amplifier 16 is connected to the calibration factor adjustment means 20 which converts the output of the differential amplifier 16 into a measure of the displacement of the location of the region of impingement of the migrating plurality of ions falling on the ion collection means 13 due to the velocity of the fluid. In the apparatus shown in FIG. 1 the calibration factor adjustment means is a divider which divides the differential current measurement indicated by amplifier 16 by the sum of the ion currents measured by the voltage differences across resistors 3 and 18. The quotient so calculated is a measure of the displacement of the location of the region of impingement of the migrating plurality of ions from its position under the conditions of zero fluid flow. The high voltage power supplies 17, 19 may comprise any of the widely used types which can provide an output voltage which is controlled by the voltage difference between the input terminal and ground. These power supplies are used to create intense electric fields in the vicinity of the region of reduced radius of curvature 2, 11 of the ionizing means.

These intense electric fields cause a plurality of ions to be formed in the region of reduced radius of curvature 2, 11 of the ionizing means.

The current returning to the power supply 17 from the ion collecting means 13 passes through resistor 18. The voltage difference across this resistor is a measure of the rate of ion collection by the ion collection means 13 of ions which have been created by ionizing means 12. This voltage difference when applied between power supply ground A and power supply input terminal B on the high voltage power supply 17 can permit automatic adjustment of the voltage of this power supply 17 to keep constant the rate of ion collection by the ion collection means 13 of ions which have been created by ionizing means 12.

Similarly the current returning to the power supply 19 from the ion collecting means 13 passes through resistor 3. The voltage difference across this resistor is a measure of the rate of collection by the ion collection means 13 of ions which has been created by ionizing means 1. This voltage difference when applied between power supply ground A and power supply input terminal B on the high voltage power supply 19 can permit automatic adjustment of the voltage of this power supply 19 to keep constant the rate of ion collection by the ion collection means 13 of ions which have been created by ionizing means 1.

The first exemplary embodiment shown in FIG. 1 can satisfy the three necessary conditions specified earlier (for an apparatus which eliminates changes in calibration of an ion drift fluid velocity meter due to changes in ion mobility) when the ion current is made sufficiently high so as to make the electric field intensity in the region between the electrodes 12 and 1 and the ion collecting means 13 be principally determined by the space charges therein. This condition is readily satisfied with an ion current from each of electrodes 12 and 1 of the order of 10 or more microamperes.

Many variations of this embodiment are possible, and have been found to be satisfactory.

Figure 2:
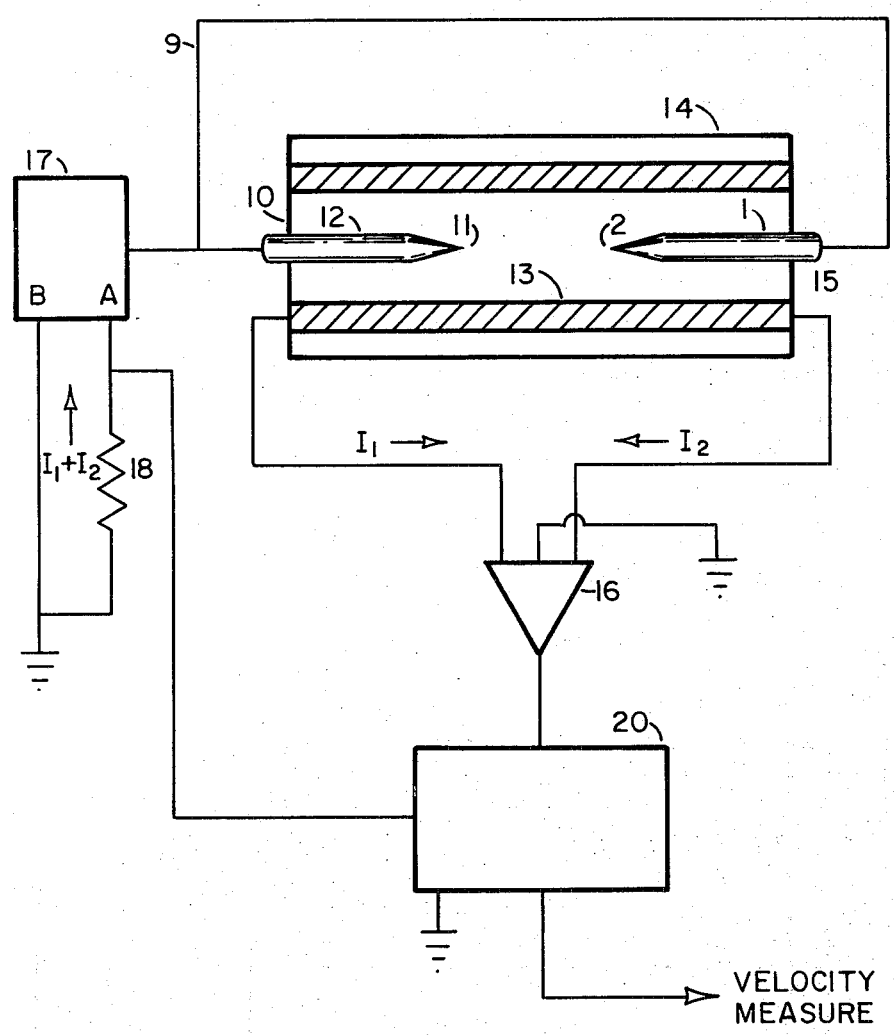
FIG. 2 shows another form of the invention in which only one power supply is used.

In embodiment 2 shown in FIG. 2 electrode 1 can be connected to electrode 12 and power supply 19 and resistor 3 can be eliminated, thus simplifing the overall system. In this embodiment the voltage difference across resistor 18 is a measure of the rate of ion collection by the ion collection means 13 of ions which have been created by both ionizing means 12 and 1.

Embodiment 3, differs from that shown in FIG. 1 only in that electrode 1, power supply 19 and resistor 3 are eliminated. In this embodiment the voltage difference across resistor 18 is a measure of the rate of ion collection by the ion collection means 13 of ions which have been created by ionizing means 12.

Figure 3:
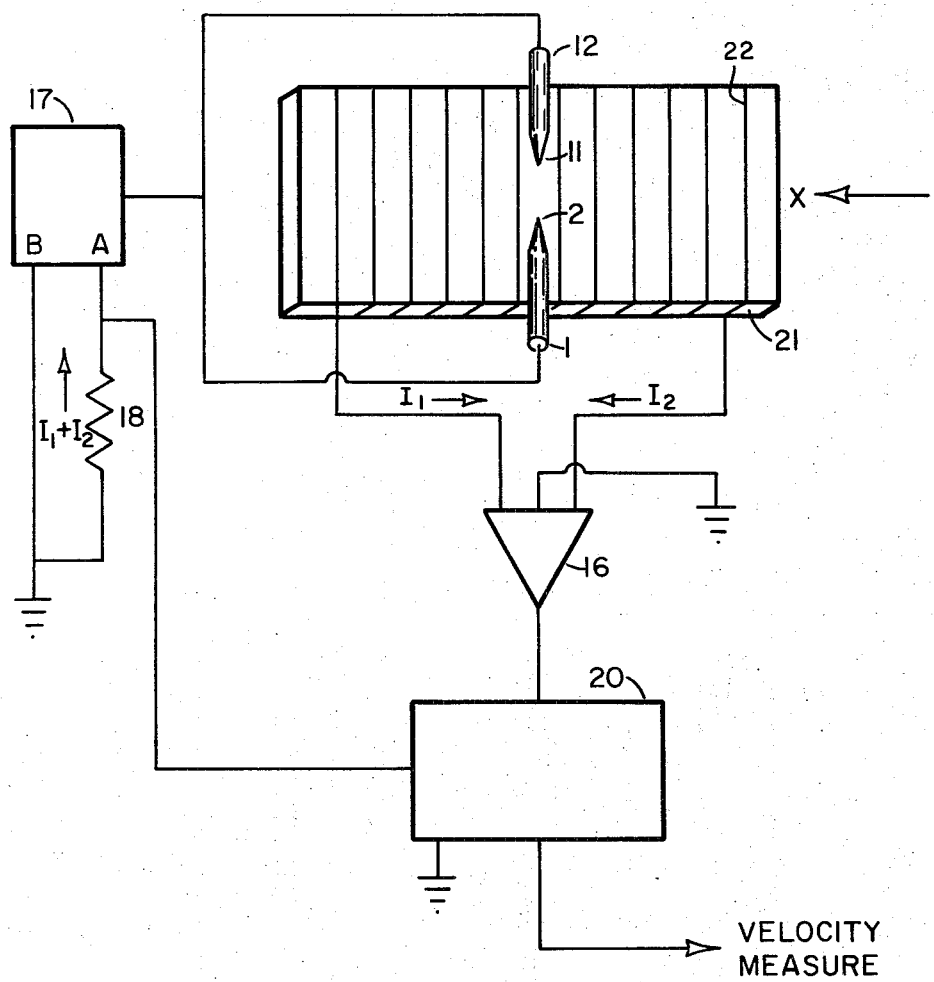
FIG. 3 shows another form of the invention using an open surface configuration.

In embodiment 4 shown in FIG. 3 the elements of embodiment 3 can be rearranged in an open surface configuration.

The ion collecting electrode 22 is an electrical resistance member suitably wound or deposited on substrate 21. In this embodiment the output of the calibration factor adjustment means 20 is a measure of the fluid velocity in the "X" direction.

Each of the configurations indicated in the preceding four exemplary forms of the invention measure the displacement of the migrating plurality of ions from its zero fluid velocity position by measuring the differential currents from the two ends of the resistive ion collecting means 13 and then dividing this differential current by the total current. This displacement can be measured directly.

Figure 4:
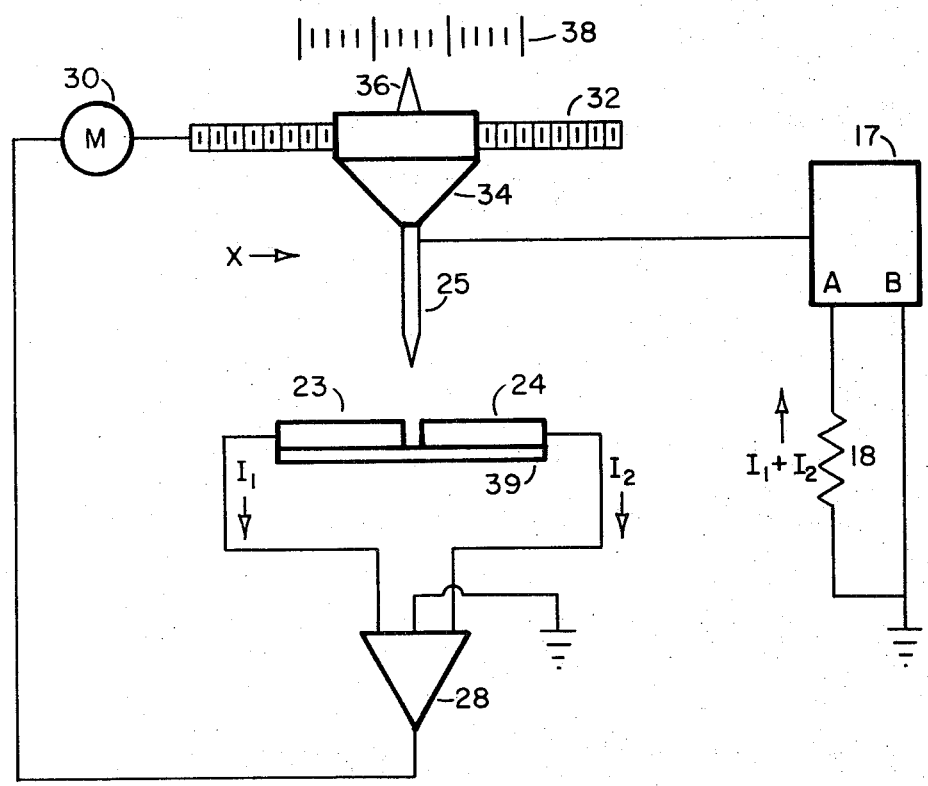
FIG. 4 shows an ion collector form for equalizing first and second ion collecting currents.

In embodiment 5 shown in FIG. 4 the resistive elements of the ion collecting means in embodiments 1, 2, 3 and 4 are replaced by two ion collector members 23, 24 which are insulated electrically from one another and from the housing structure 39, providing a current balancing embodiment, wherein the outputs from the two ion collecting members 23 and 24 are fed to differential amplifier 28 which compares the two currents and applies the difference to a reversible motor 30 arranged to rotate screw 32 so as to drive traveling nut 34, which carries ionizing means 25 in a direction which will equalize the currents $I_1$ and $I_2$ so as to null the output of amplifier 28. The traveling nut 34 carries a pointer 36 which indicates on scale 38 the flow velocity.

If the ionizing means 25 is located to make the current in each ion collecting member equal to the other under the conditions of no flow, and if the ionizing means is displaced to keep the current in each ion collecting member equal to the other under the condition of fluid flow, then the spacial change in the apparent position of the ionizing means relative to the ion collecting members required to keep these currents equal will be a measure of the fluid flow. The ionizing means can be displaced manually or automatically, by motor 30, as is shown in FIG. 4.

The displacement of the pointer 36 from its position under conditions of no fluid flow will be a measure of the fluid velocity in the "X" direction, when power supply 17 keeps constant the rate of ion collection by both ion collecting members 23, and 24.

The method of keeping the rate of ion collection constant is as has been described in FIG. 1.

Figure 5:
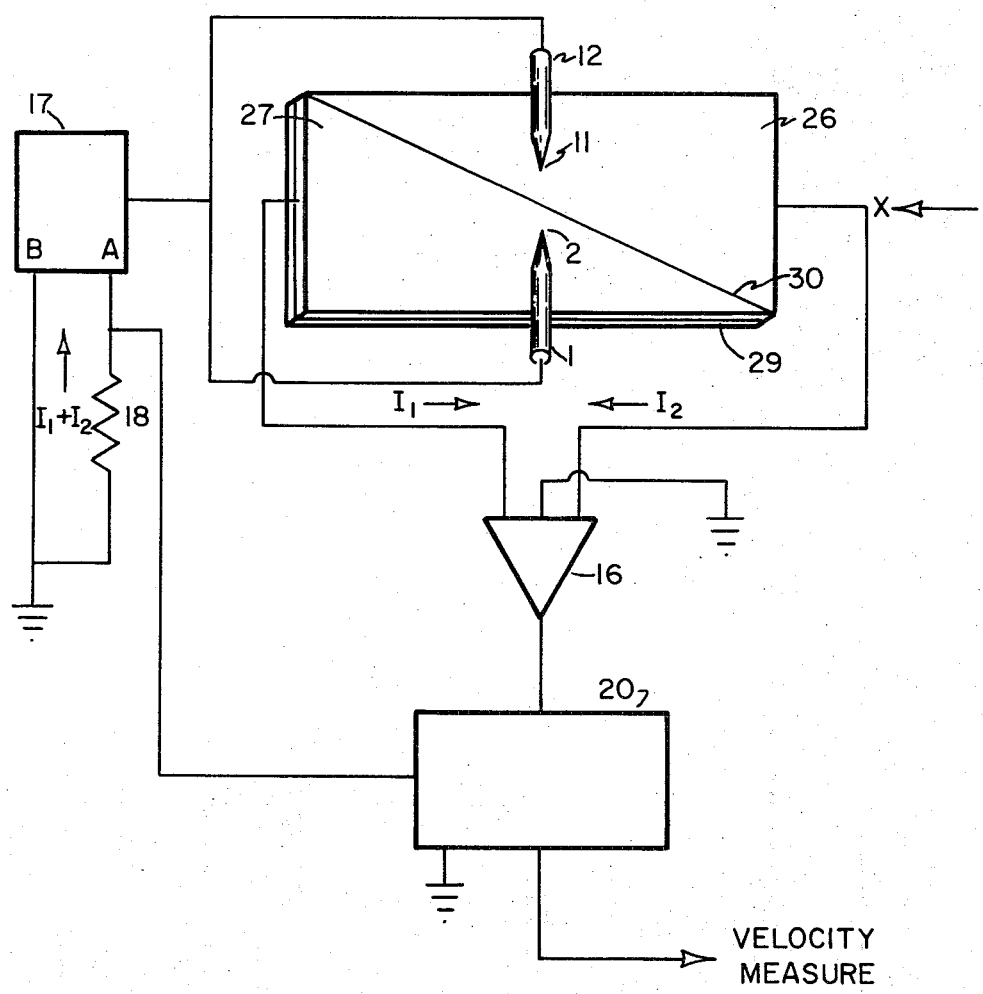
FIG. 5 shows a varying area ion collector form.

Embodiment 6 shown in FIG. 5 avoids the need for change in the apparent position of the ionizing means, in embodiment 5, which was required to equalize currents $I_1$ and $I_2$ as the fluid flow velocity changes, and also avoids the need for the resistive element in the ion collecting means in embodiments 1, 2, 3 and 4. This is accomplished by replacing the resistive element 22 of the ion collecting means in FIG. 3 by an ion collecting means which consists of both plates 26 and 27 which are insulated electrically from one another and from the housing structure 29. Each plate collects a fraction of the total ion current. If the location of the line of separation 30 between plates 26 and 27 is chosen to make the difference between the current collected by the upstream plate 26 and the current collected by the downstream plate 27 be proportional to the displacement of the migrating plurality of ions, then the difference in the two collected currents when divided by the total current will be a measure of the fluid velocity. Since the displacement of the migrating plurality of ions is linear with fluid flow, it is necessary to increase the area of the upstream plate 26 and reduce the area of the downstream plate 27 linearly with distance measured upstream from the zero velocity ion beam location, and to increase the area of the downstream plate 27 and reduce the area of the upstream plate 26 linearly with distance measured downstream from the zero velocity ion beam location. In FIG. 5 this is accomplished by a linear line of separation 30. Although it is readily apparent that the change in areas described above can be accomplished by many other lines of separation.

The remaining elements of FIG. 5 are identical to those shown in FIG. 3.

I claim:

1. Fluid velocity meter apparatus which measures the velocity of fluids passing therethrough comprising:
   ionizing means located proximate to the path of fluid flow;
   ion collecting means located proximate to said path of fluid flow opposite to the ionizing means, said ionizing means, in the presence of a fluid, causing a plurality of ions of the fluid to be formed thereabout, the plurality of ions formed thereabout migrating toward the ion collecting means and impinging thereon;
   power supply means for applying a first voltage polarity to said ionizing means and a second voltage polarity to said ion collecting means;
   means responsive to the "location of the region of impingement of the migrating plurality of ions" on the ion collecting means to measure the displacement thereof effected by fluid velocity variation;
   said power supply means including means for measuring the rate of ion collection by the ion collecting means, wherein the rate of ion formation in the fluid is sufficiently high that the electric field intensity in the space between the ionizing means and the ion collecting means is determined primarily by the ion space charge in the region, and not by the surface charges of the velocity meter;
   and ion current compensation means for adjusting the measure of the displacement of the location of the region of impingement of the migrating plurality of ions in accordance with said measured rate of ion collection, whereby the adjusted measure of the displacement of the "location of the region of impingement of the migrating plurality of ions" is representative of the velocity variation.

2. The apparatus of claim 1 wherein said ion collecting means has at least first and second portions, one of said portions being located upstream of the other when fluid flows along said flow path, said first and second portions of said ion collecting means adapted to develop first and second currents respectively when said ionizing means is energized in the presence of a fluid.

3. The apparatus of claim 2, wherein said means responsive to the location of the region of impingement of the migrating plurality of ions includes comparison means and means for equalizing said first and second currents.

4. The apparatus of claim 3, wherein said means for equalizing said currents comprises means to spacially change the apparent position of said ionizing means with relation to said first and second portions of said ion collection menas, wherein the apparent change in position is a measure of fluid velocity variation.

5. The apparatus of claim 2, wherein said ion collecting means comprises substrate means having resistive member means mounted thereon, said resistive member means having first and second end terminals, said first portion of said ion collecting means being defined as the resistive portion thereof between the point of impingement on the resistive member of the median ion of the ion cloud surrounding said ionizing means when said ionizing means is energized and said first end terminal and said second portion of said ion collecting means being defined as the resistive portion thereof between said point of impingement of said median ion and said second end terminal.

6. The apparatus of claim 5, wherein said resistive member comprises a resistance wire wound on said substrate.

7. The apparatus of claim 5, wherein said resistive member comprises a resistive layer of material deposited on said substrate.

8. The apparatus of claim 2, wherein the area of said first ion collecting portion is increased, and the area of said second ion collecting portion is reduced, with distance downstream from the location of the ionizing means, and where the area of said second ion collecting portion is increased, and the area of said first ion collecting portion is reduced with distance upstream from the location of the ionizing means.

9. The apparatus of claim 2 wherein said ion collecting means is in the form of a hollow right circular cylinder having said ionizing means mounted therein.

10. The apparatus of claim 9, where said ionizing means are one or more coaxial needles within the hollow right circular cylinder collecting means.

11. The apparatus of claim 2 wherein said ion collecting means is in the form of an open surface having said ionizing means mounted above said surface.

12. The apparatus of claim 11, where said ionizing means are one or more needles.

13. The apparatus of claim 2, wherein said power supply means includes means responsive to the measured rate of ion collection for adjusting said first and second voltage polarities to maintain said rate of ion collection on the ion collecting means constant.

* * * * *